Aug. 22, 1950 G. C. BECK 2,520,025
CRANKSHAFT REFINISHING TOOL
Filed Feb. 11, 1947 3 Sheets-Sheet 1
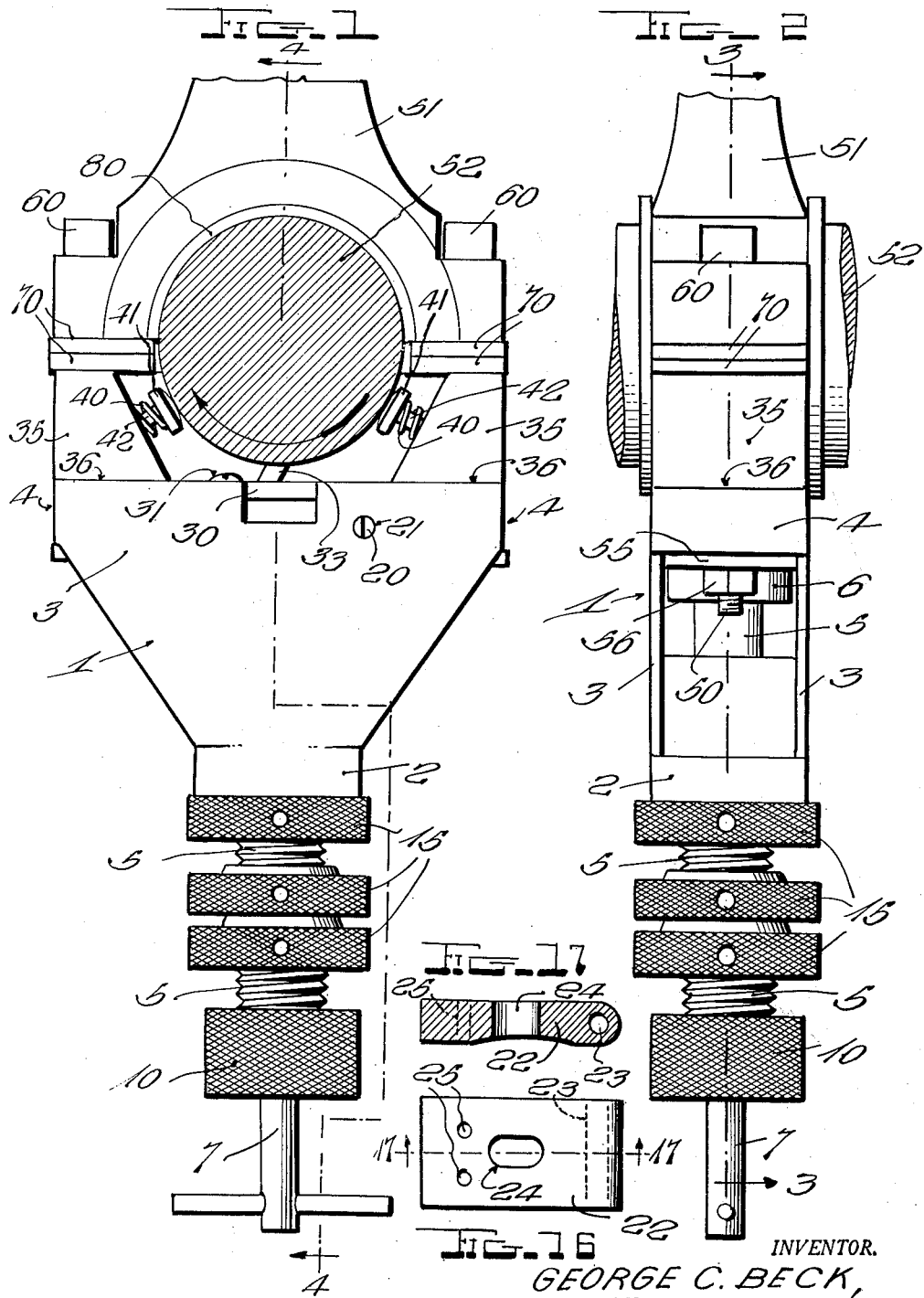
INVENTOR.
GEORGE C. BECK,
BY
William C. Linton
ATTORNEY

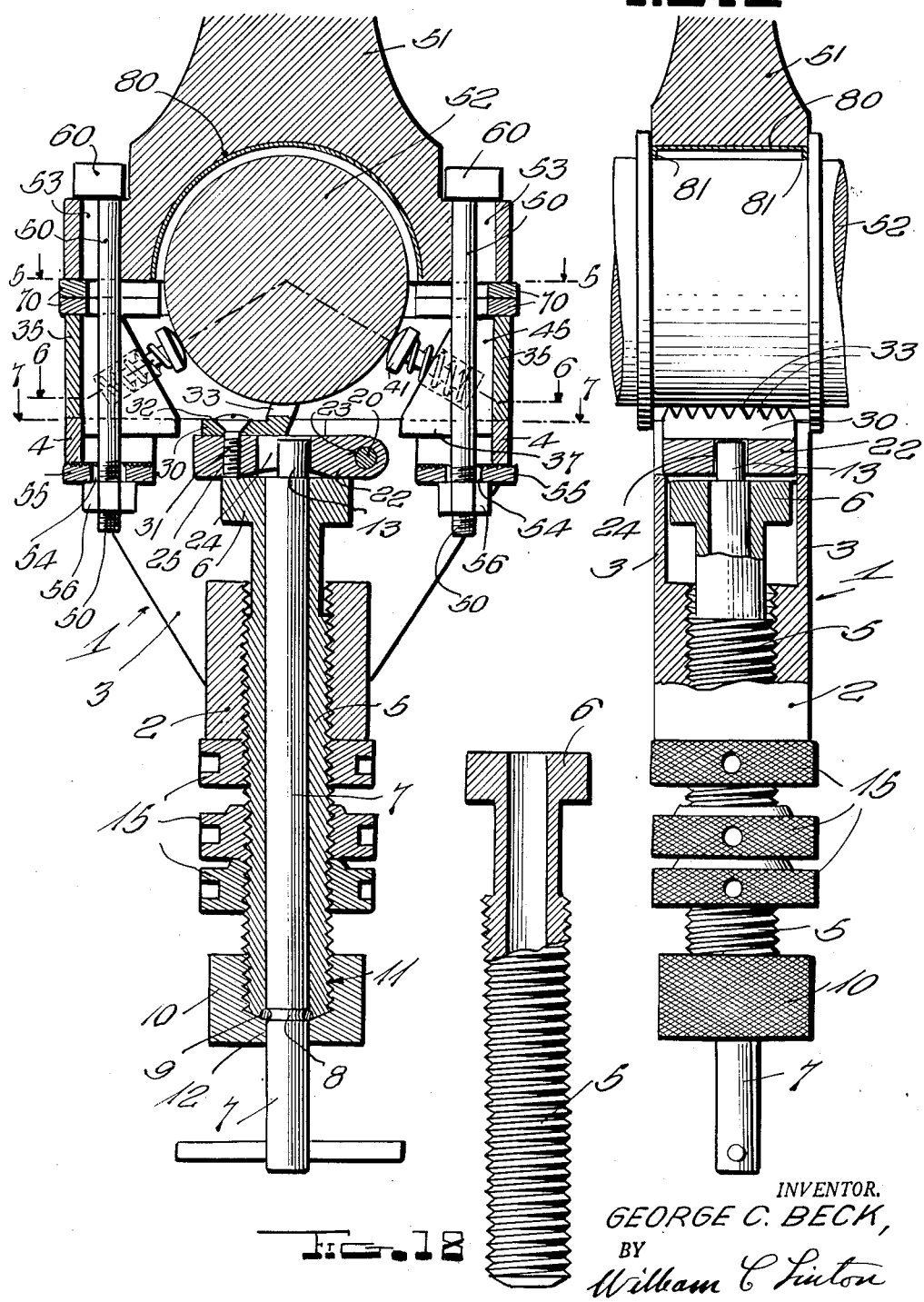

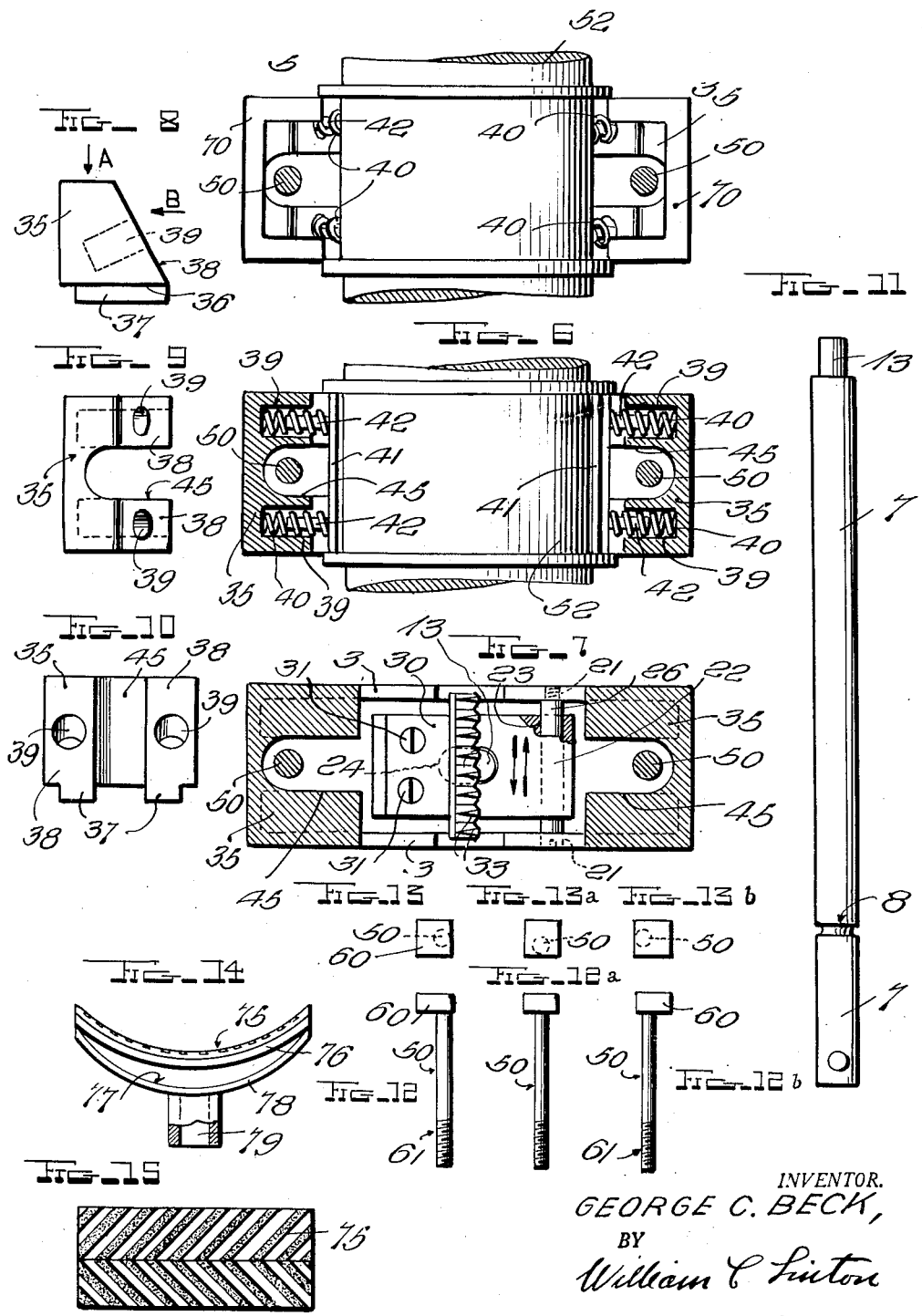
Aug. 22, 1950 — G. C. BECK — 2,520,025
CRANKSHAFT REFINISHING TOOL
Filed Feb. 11, 1947 — 3 Sheets-Sheet 3
INVENTOR.
GEORGE C. BECK,
BY William C. Linton
ATTORNEY Patented Aug. 22, 1950

2,520,025

UNITED STATES PATENT OFFICE 2,520,025

CRANKSHAFT REFINISHING TOOL

George C. Beck, Spokane, Wash.

Application February 11, 1947, Serial No. 727,871

6 Claims. (Cl. 82—4)

The present invention relates to turning tools and more particularly to tools for turning crankshaft journals after they have become uneven through wear, faulty lubrication or other causes.

Crankshaft journals, also known as crank pins, wear unevenly throughout their periphery due principally to one portion thereof receiving the greatest thrust from the connecting rod attached thereto during the downward propelling stroke of said rod. The journal therefore wears the most on one side and becomes out of round. Continued wear of this type results in a knocking in the motor that can only be eliminated by removing some of the metal from the journal to restore it to a true smooth cylindrical form that will accurately mate with its respective connecting rod crank pin bearing.

To maintain the cost of repair work of this type at a minimum it is necessary that the crankshaft be trued while still mounted in its main bearing of the engine. The crankshaft journals can be reached in most instances by removing the oil pan of the engine and then detaching the bearing cap of each connecting rod. These caps which house the lower half of the crankpin bearing can be removed by unscrewing the locking bolts and nuts extending through openings in said caps and the upper half of the bearing.

The present tool is designed to replace each of said caps and be connected around the crankshaft journals to the connecting rod thereabove. Various refinishing tools have been suggested heretofore for being mounted in this manner, but the present tool provides a completely rounded, smooth and true journal not attained by the previously known tools.

The principal object of the present invention therefore is to provide a refinishing tool for crankshaft journals that will refinish the journals while retained in their main bearings in the engine.

Another important object of the invention is to provide a refinishing tool which can replace connecting rod caps and be connected to the connecting rod whereby upon rotation of the crankshaft the journals thereof will be trued in in improved manner.

A still further object of the invention is to provide a crankshaft journal refinishing tool of simple and economic construction that will provide a round, true and smooth journal surface.

Other objects of the invention will be in part obvious and in part pointed out in the following detached description of the accompanying drawings wherein:

Fig. 1 is a side elevation of a tool according to the present invention in position upon a crankshaft and the latter being shown in section.

Fig. 2 is an end elevation of Fig. 1.

Fig. 3 is a vertical sectional view taken on the line 3—3 of Fig. 2 in the direction of the arrow points.

Fig. 4 is a transverse section partly in elevation taken on the line 4—4 of Fig. 1 in the direction of the arrow points.

Fig. 5 is a cross-sectional view taken on line 5—5 of Fig. 3 in the direction of the arrow points and with the crank shaft shown in elevation.

Fig. 6 is a similar cross section taken on line 6—6 of Fig. 3.

Fig. 7 is a similar cross section taken on line 7—7 of Fig. 3.

Fig. 8 is a side elevation of one of the bearing blocks forming a part of the invention.

Fig. 9 is a top view of Fig. 8 looking in the direction of the arrow point A.

Fig. 10 is a front view of Fig. 8 looking in the direction of the arrow point B.

Fig. 11 is a side elevation of the cutter control rod.

Figs. 12, 12a and 12b are the respective side views of one of the locking bolts employed with the present tool showing the offset position of the shank portion relative to the head thereof.

Figs. 13, 13a and 13b are top views of Figs. 12, 12a and 12b respectively.

Fig. 14 is a side elevation partly in section of the abrading member employed for final smoothing of the journal.

Fig. 15 is a top view of Fig. 14.

Fig. 16 is a detail plan view of the cutter support.

Fig. 17 is a sectional view taken on the line 17—17 of Fig. 16 in the direction of the arrow points.

Fig. 18 is a side elevation of the elevating tube with the upper portion in cross-section to disclose the interior thereof.

Referring now more particularly to the accompanying drawings wherein like and corresponding parts are designated by similar reference characters, numeral 1 indicates the supporting frame of the tool having a tubular section 2 from the top of which extend a pair of parallel spaced side plates 3 connected together at their upper ends by means of the cross plates or braces 4.

Said tubular section 2 is internally threaded and has an externally threaded tube 5 positioned therethrough, but in threaded engagement therewith for longitudinal movement relative to section 2. The top of said tube 5 is enlarged to form a flange 6.

A control rod 7 is rotatably mounted through the bore of said tube 5 extending from both ends thereof. Said rod 7 has an annular groove 8 formed in the periphery thereof in which is positioned a split bearing ring 9. A cap 10 is rotatably mounted on said rod 7 and is internally threaded at 11 for being screwed on the lower end of said tube 5 whereby the ring 9 will be retained between the lower end of the tube 5 and the cap 10. Bore 12 of cap 10 is of a smaller diameter than that of the ring 9 and thereby retains rod 7 within said tube 5.

The upper end of rod 7 has an eccentrically positioned stud pin 13 formed thereon of smaller diameter than that of the rod.

Said tube 5 has a plurality of lock nuts 15 mounted thereon for abutting against said section 2 and one another whereby tube 5 can be raised and lowered and retained at any position desired relative to said section 2.

A pin 20 extends through opposed openings 21 each formed in one of said plates 3 and is retained thereby. A cutter supporting plate 22 has said pin 20 extending through an opening 23 formed laterally through an end portion thereof whereby said plate 22 is pivotally and slidably connected to frame 1.

Said plate 22 further has a centrally located longitudinally extending slot 24 formed therethrough into which extends the eccentric stud pin 13 of control rod 7. A pair of threaded openings 25 are further formed through the opposite end portion of plate 22.

A cutter 30 is mounted on said plate 22 and connected thereto by a pair of screws 31 extending through openings 32 formed through the cutter and with each screwed into one of said openings 25. The cutting edge thereof comprises a series of spaced and parallel cutting teeth or serrations 33 as best shown in Fig. 7 capable of having cutting engagement with the crankshaft when the latter rotates in the direction of the arrow as shown in Fig. 1.

As best shown in Figs. 8, 9 and 10 a pair of bearing support blocks 35 are each mounted on the top portion of frame 1 with the flat bottom 36 thereof seated on the top of plates 3 and braces 4. Said bottoms 36 each have a pair of parallel flanges 37 depending perpendicular therefrom and which flanges 37 are spaced apart sufficiently to be positioned between, but abut against said plates 3 and the adjacent brace 4 for preventing lateral or outward movement of said blocks 35 relative to frame 1. The interior face 38 of each block 35 extends on inwardly and upwardly directed slant relative to said bottom 36. Said faces 38 each have a pair of recesses 39 formed therein and in each of which is positioned one of a pair of coil springs 40. Each pair of springs 40 are connected together by a pressure and bearing bar 41 whose legs 42 each extend within one of said coils.

Said blocks 35 are substantially U-shaped when viewed from the top due to a recess 45 formed through the central portion thereof for the passage of locking bolts 50 hereinafter described.

In operation, the tool is connected to a connecting rod 51 from which the usual journal bearing cap has been removed, by positioning bearing bars 41 against opposite sides of the lower face of journal 52 and passing a bolt 20 through each connecting rod opening 53, through recess 45 of each block 35 and opening 54 formed in each plate 55 abutting against the lower serrated face of braces 4.

A nut 56 is screwed on the lower end of each bolt 50 and tightened for drawing frame 1 towards the connecting rod forcing bars 41 tightly against the journal face for supporting the same under pressure of springs 40.

With lock nuts 15 loosened tube 5 is screwed upwardly within section 2 moving rod 7 upwardly and cutter 30 mounted thereon against the journal. With the cutter in proper position for planing, the journal lock nuts 15 are screwed against one another and section 2 thereby retaining tube 5, rod 7 and cutter 30 in position. From time to time tube 5 can be moved upwardly as required to force the cutter 30 against the journal for increasing the cut.

Rotation of rod 7 by hand in turn rotates the eccentric stud pin 13 which revolves in slot 24 for reciprocating the cutter 30 laterally upon pin 20. The serrations 33 of cutter 30 are thereby moved back and forth across the entire area of the journal being cut to form a smoother surface.

Some locking bolt openings 53 in connecting rods of certain manufacture are offset relative to one another and to insure that cutter 30 is centrally located against the journal and to permit ready screwing of nuts 56 between plates 3, special locking bolts 50 are employed. As shown in Figs. 12 and 13, these bolts have square heads 60 from which extend relatively thin threaded shanks 61.

However, as indicated, shanks 61 are offset or positioned to one side of their head 60. The heads 60 are held by the recesses in the face of the connecting rod in the usual manner but the shanks 61 can be positioned against any side of openings 53 whereby both bolts employed extend vertically in a plane bisecting said journal. Nuts 56 are of a relatively small size which can therefore be employed and are easily turned in the limited space between plates 3.

U-shaped shims 70 can be employed when necessary between blocks 35 and the bottom of the connecting rod to properly space these members. Similarly shims can be positioned between cutter 30 and supporting plate 22 to raise the cutter when needed.

With the tool in proper position turning of the crankshaft by use of the motor starter for example will cause cutter 30 to plane the journal as the tool rides with the journal, but is held from rotation by its connection to the connecting rod. Turning rod 7 reciprocates the cutter 30 whereby the journal is shaved smoothly completely across the face thereof.

To finish the trueing of the journal an abrasive sheet 75 supported on a plate 76 of spring metal extending across the arcuate face 77 of support 78 is substituted for cutter 30. Loosening nuts 15, tube 5 is screwed downwardly bringing rod 7 out of engagement with cutter 30. Removing pin 20 from plates 3 permits the removal of cutter 30. Support 78 then replaces cutter 30 with recess 79 thereof receiving stud-pin of the rod 7 upon upward movement of tube 5. With abrasive 75 bearing against the journal, lock nuts 15 are tightened and further operation is continued.

The abrasive surfaces of the sheet 75 extend diagonal as best shown in Fig. 15 so that when the holder 76 is reciprocated by turning the shaft 7 abrasive sheet will be self cleaning.

This tool may be used in refinishing crankshaft of engines employed with most standard make cars and the cutting tool 33 may vary in width to meet the particular requirements. In most cases it is desirable to substitute a steel hardened insert 80 for the conventional babbitt insert between the connecting rod and the journal 80 has annular flanges at the opposite side thereof which bear against the opposite ends of the journal 52 as best shown in Fig. 4 in order to retain the central portion of the insert 80 out of contact with the journal or that portion of the journal which is being cut or refinished. This insert 80 is prevented from turning about the journal by means of the shims 70 which latter extend within the possible travel of the insert. The cutter 33 only acts upon the badly worn parts of the journal which extend between the flanges 81 of the insert. In cases where the insert 80 is not employed and the entire length of the journal is to be refinished, a wide cutter 33 may be employed or one of the width as illustrated in Fig. 7. As the opposite sides of the holder are opened this wide cutter 33 may reciprocate through the opened side walls of the tool holder or casing.

It is appreciated that the tool is capable of considerable modification and such changes thereto as come within the scope of the appended claims are deemed to be part of my invention.

I claim:

1. A journal refinishing tool for a crankshaft mounted in an engine comprising a frame, journal bearings resiliently mounted on said frame being shaped to form the cap of a connecting rod about said journal, a cutter pivotally and slidably mounted on said frame between said journals, means carried by said frame for pivoting said cutter to and from said head, additional means carried by said frame for oscillating said cutter laterally of said frame.

2. A journal refinishing tool for repairing a crankshaft mounted in an engine comprising a tubular member, a pair of supporting plates mounted on said member and extending longitudinally therefrom, a rod rotatably mounted through said tubular member, means for longitudinally adjusting said rod relative to said tubular member, an end of said rod having an offset portion, a cutter pivotally and slidably connected between said support plates, an opening formed in said cutter having said rod offset portion extending therein for providing lateral oscillation to said cutter upon rotation of said rod, means connecting said support plates to a capless connecting rod with said journal therebetween and bearings resiliently mounted between said support plates and said journal.

3. A journal refinishing tool for repairing a crankshaft mounted in an engine comprising a tubular member, a pair of support plates mounted on said member, a rod rotatably mounted through said tubular member and between said plates, a pin detachably mounted laterally of said support plates, a cutter pivotally and slidably mounted on said pin, a crank formed on one end of said rod and connected to said cutter for oscillating the same laterally of said pin, means for moving said rod longitudinally whereby said cutter is pivoted about said pin, resiliently mounted journal support bearings carried by said support plates and means for connecting said support plates to a capless connecting rod with said journal therebetween.

4. A crankshaft journal refinishing tool comprising a frame formed by a pair of spaced parallel plates capable of being connected to a capless connecting rod and adjacent said journal, a tubular member supporting said plates, a cutter slidably connected to said frame plates, a crank rotatably mounted through said tubular member and connected to said cutter for oscillating the same laterally of said plates, and a plurality of resiliently supported journal bearings mounted on said frame plates on opposite sides of said cutter.

5. A journal refinishing tool for repairing a crankshaft comprising a frame capable of forming the cap of a connecting rod adjacent said journal, a pair of blocks each mounted on an opposite side of said cutter on said frame, a pair of journal bearings each resiliently mounted on one of said blocks and means carried by said frame for oscillating said cutter.

6. A crankshaft journal refinishing tool for connection to a capless connecting rod and about said journal comprising a cutter carrying frame, means for connecting said frame to said capless connecting rod and on an opposite side of the journal to be refinished, a semi-circular insert positioned in the bearing groove of said crankshaft, and said insert being formed with a pair of flanges each for contacting an opposite end of said journal and spacing said insert therefrom.

GEORGE C. BECK.

REFERENCES CITED

The following references are of record in the file of this patent:

UNITED STATES PATENTS

| Number | Name | Date |
|---|---|---|
| 1,408,078 | Cook | Feb. 28, 1922 |
| 2,162,187 | Tharp | June 13, 1939 |
| 2,201,664 | Fergerson | May 21, 1940 |
| 2,329,806 | Wilson | Sept. 21, 1943 |
| 2,330,075 | Neubauer | Sept. 21, 1943 |
| 2,419,189 | Morrissette | Apr. 15, 1947 |

FOREIGN PATENTS

| Number | Country | Date |
|---|---|---|
| 3,251 | Great Britain | A. D. 1908 |